United States Patent [19]
Asai et al.

[11] Patent Number: 5,814,385
[45] Date of Patent: Sep. 29, 1998

[54] LAMINATED POLYESTER FILM TO BE LAMINATED ONTO METAL PLATE

[75] Inventors: Takeo Asai, Sagamihara; Kinji Hasegawa, Hachioji; Mitsumasa Ono, Sagamihara, all of Japan

[73] Assignee: Teijin Limited, Osaka, Japan

[21] Appl. No.: 617,759

[22] PCT Filed: Jul. 19, 1994

[86] PCT No.: PCT/JP94/01185

§ 371 Date: Mar. 15, 1996

§ 102(e) Date: Mar. 15, 1996

[87] PCT Pub. No.: WO96/02387

PCT Pub. Date: Feb. 1, 1996

[51] Int. Cl.⁶ .............................. B32B 1/02; B32B 15/08; B32B 27/08; B32B 27/36
[52] U.S. Cl. ..................... 428/35.8; 428/141; 428/216; 428/323; 428/480; 206/524.6
[58] Field of Search ................... 428/35.8, 35.7, 428/213, 214, 216, 217, 347, 399, 480, 910, 141, 323; 528/302, 308, 308.1, 308.6; 525/437, 444, 448; 206/524.6

[56] References Cited

U.S. PATENT DOCUMENTS

| | | | |
|---|---|---|---|
| 4,362,775 | 12/1982 | Yabe et al. | 428/213 |
| 5,059,470 | 10/1991 | Fukuda et al. | 428/142 |

FOREIGN PATENT DOCUMENTS

| | | |
|---|---|---|
| 0035835 | 9/1981 | European Pat. Off. . |
| 0379190 | 7/1990 | European Pat. Off. . |
| 0474240 | 3/1992 | European Pat. Off. . |
| 0544545 | 6/1993 | European Pat. Off. . |
| 0580404 | 1/1994 | European Pat. Off. . |
| 0586161 | 3/1994 | European Pat. Off. . |
| 54-143387 | 11/1979 | Japan . |
| 62-164538 | 7/1987 | Japan . |
| 64 22530 | 1/1989 | Japan . |
| 1192545 | 8/1989 | Japan . |
| 1192546 | 8/1989 | Japan . |
| 2 57339 | 2/1990 | Japan . |
| 5269819 | 10/1993 | Japan . |
| 5320378 | 12/1993 | Japan . |
| 5338103 | 12/1993 | Japan . |
| 6218895 | 8/1994 | Japan . |
| 2181104 | 4/1987 | United Kingdom . |

OTHER PUBLICATIONS

Database WPI, Week 9431, Derwent Publ., Ltd., Abstract of Jap. Laid–Open Pat. Publ. No. 6–182953 (Jul. 5, 1994).

*Primary Examiner*—Vivian Chen
*Attorney, Agent, or Firm*—Sherman and Shalloway

[57] ABSTRACT

A laminated polyester film comprising an aromatic copolyester layer having a surface roughness of 2 to 13 nm and a polyester layer having a surface roughness (Ra) of at least 15 nm. This laminated polyester film has improved impact resistance particularly at low temperatures and improved taste-retaining property while retaining the excellent moldability, heat resistance, retort sterilization resistance and flavor-retaining property possessed by copolyester films.

16 Claims, No Drawings

LAMINATED POLYESTER FILM TO BE LAMINATED ONTO METAL PLATE

BACKGROUND OF THE INVENTION

1. Field of the Invention

The present invention relates to a laminated polyester film for use as a film to be laminated onto a metal plate. More particularly, the present invention relates to a laminated polyester film to be laminated onto a metal late, which exhibits excellent moldability when laminated onto a metal plate and subjected to can fabrication by drawing or the like, which has good winding property, and which can be used for production of metal cans (e.g. cans for beverages and cans for foods) having excellent heat resistance, retort sterilization resistance, flavor and taste-retaining property, impact resistance, etc.

2. Description of the Related Art

Metal cans are generally coated at the inner and outer surfaces for the prevention of said surfaces from corrosion. Recently, methods for acquiring rust prevention without using an organic solvent have been developed for the purpose of achieving the simplification of the process employed, the improvement in hygiene aspect, the elimination of environmental pollution, etc. and, as one such method, it has been tried to coat the inner and outer surfaces of metal plate with a thermoplastic resin film. That is, researches have been pushed forward on a method of laminating a thermoplastic resin film onto a metal plate such as tin-plated steel plate, tin-free steel plate, aluminum plate or the like and then fabricating the laminated metal plate into a can by drawing or the like. Polyolefin films and polyamide films have been attempted to use as the thermoplastic resin film, but these films do not always satisfy all of moldability, heat resistance, flavor-retaining property and impact resistance.

Meanwhile, polyester films, particularly a polyethylene terephthalate film has drawn attention on the balanced properties, and there were made various proposals of using them as a base film. Such proposals are as follows.

(A) A biaxially oriented polyethylene terephthalate film is laminated onto a metal plate via an adhesive layer of a low-melting polyester, and the laminated metal plate is used as a material for can (Japanese Laid-Open Patent Application No. 56-10451 and Japanese Laid-Open Patent Application No. 1-192546).

(B) An amorphous or very low crystalline aromatic polyester film is laminated onto a metal plate, and the laminated metal plate is used as a material for can (Japanese Laid-Open Patent Application No. 1-192545 and Japanese Laid-Open Patent Application No. 2-57339).

(C) A thermoset, biaxially oriented polyethylene terephthalate film having a low orientation is laminated onto a metal plate, and the laminated metal plate is used as a material for can (Japanese Laid-Open Patent Application No. 64-22530).

The study by the present inventors has revealed, however, that any of the above proposals fails to provide cans of sufficient properties and each involves the following problems.

In the above (A), the biaxially oriented polyethylene terephthalate film has excellent heat resistance and flavor-retaining property but has insufficient moldability. Therefore, when the laminated metal plate is subjected to can fabrication which inevitably invites large deformation, there occur whitening (generation of microcracks) and rupture of film.

In the above (B), the film used is an amorphous or very low crystalline aromatic polyester film and accordingly, has good moldability. However, the film is inferior in flavor-retaining property, is liable to embrittle easily by the post-treatment such as printing and retort sterilization after can fabrication, or during a long-termed storage; and may deteriorate to a film which tends to crack easily when an external impact is applied thereto.

In the above (C), the film is intended to have effects in a region between the above (A) and (B). The film, however, can not attain a low orientation to such a extent that it can be used in can fabrication; even if fabricable in the region with small deformation, the film has the same problems as the film of the above (B). That is, the film tends to embrittle easily by the post-treatment (such as printing and retort treatment for sterilization of can contents) after can fabrication, and may deteriorate to a film which cracks easily when an external impact is applied thereto.

In order to solve these problems, the present inventors thought of using a film made of a copolyester and conducted extensive study. As a result, it was found that copolyester films have excellent moldability, heat resistance, retort sterilization resistance and flavor-retaining property, but have insufficient impact resistance particularly at low temperatures of 15° C. or lower and that, when a metal can onto which said film is laminated undergoes impact (e.g. impact by dropping) at low temperatures, the film is liable to have cracks. This low impact resistance at low temperatures is an unnegligible problem for metal cans to be handled in a cooled state, such as metal cans for juices or refreshing drinks.

It was further found that when copolyester films are used, the resulting metal cans have good flavor-retaining property generally but, when used for refreshing drinks, the taste of can contents becomes deteriorated.

SUMMARY OF THE INVENTION

An object of the present invention is, therefore, to provide a novel laminated polyester film to be laminated onto metal plate.

Other object of the present invention is to provide a laminated polyester film to be laminated onto metal plate, which has improved impact resistance, is almost free of cracks when an impact is exerted at low temperatures, and does not deteriorate the taste of refreshing drinks, etc. while retaining the excellent moldability, heat resistance, retort sterilization resistance and flavor-retaining property possessed by copolyester films.

Other objects and advantages of the present invention will be made apparent by the following description.

DESCRIPTION OF THE PREFERRED EMBODIMENT(S)

The above objects and advantages of the present invention are achieved by a laminated polyester film to be laminated onto metal plate, characterized in that the film comprises:

(A) a first layer which comprises (a1) a first aromatic copolyester composed of terephthalic acid and isophthalic acid as the main dicarboxylic acid components and ethylene glycol as the main glycol component and having a melting point of 210° to 245° C., and which has (b1) a surface roughness (Ra) of 2 to 13 nm, and (B) a second layer which comprises (a2) a second aromatic copolyester composed of ethylene terephthalate as the main recurring unit and having a melting point of 210° to 252° C., or a melt-blend product consisting of 60% by weight or more of said second aromatic copolyester and 40% by weight or less of a third aromatic polyester composed of tetramethylene terephthalate as the main recurring unit and having a melting point of 180° to 223° C., and which has (b2) a surface roughness (Ra) of at least 15 nm, and further characterized in that (C) the film exhibits excellent mold-ability when laminated onto a metal plate and subjected to deep drawing.

The laminated polyester film of the present invention comprises a first layer (A) and a second layer (B), as mentioned above.

The first layer (A) comprises a first aromatic copolyester and has a surface roughness (Ra) of 2 to 13 nm.

The first aromatic copolyester is composed of terephthalic acid and isophthalic acid as the main dicarboxylic acid components and ethylene glycol as the main glycol component. The proportion of terephthalic acid and isophthalic acid is preferably at least 97 mole % based on the total dicarboxylic acid components constituting the first aromatic copolyester, and similarly, the proportion of ethylene glycol is preferably at least 97 mole % based on the total glycol components constituting the first aromatic copolyester.

The first aromatic copolyester contains an isophthalic acid component preferably in an amount of 5 to 19 mole % based on the total amount of the dicarboxylic acid components.

As the subordinate dicarboxylic acids other than terephthalic acid and isophthalic acid of the first aromatic copolyester, there can be mentioned, for example, aromatic dicarboxylic acids such as phthalic acid, naphthalenedicarboxylic acid and the like; aliphatic dicarboxylic acids such as adipic acid, azelaic acid, sebacic acid, decanedicarboxylic acid and the like; and alicyclic dicarboxylic acids such as cyclohexanedicarboxylic acid and the like. As the subordinate glycols other than ethylene glycol, there can be mentioned, for example, aliphatic diols such as diethylene glycol, butanediol, hexanediol and the like; and alicyclic diols such as cyclohexanedimethanol and the like. These subordinate dicarboxylic acids and subordinate glycols can each be used preferably in an amount of 3 mole % or less based on the total amount of the dicarboxylic acids or glycols.

The first aromatic copolyester has a melting point of 210° to 245° C., preferably 215° to 235° C. When the melting point is lower than 210° C., the resulting laminated polyester film is inferior in heat resistance. When the melting point is higher than 245° C., the polymer has too high a crystallinity and as a consequence, the resulting laminated polyester film has inferior moldability.

Herein, the melting point of the first aromatic copolyester is determined by measuring the melting peak at a temperature elevation rate of 20° C./min by using DuPont Instruments 910 DSC. In this case, the sample amount is about 20 mg.

The first aromatic copolyester can contain inert fine particles. The inert fine particles are preferably first inert fine particles having an average particle diameter of 0.05 to 0.6 μm. The first inert fine particles are present in the first layer (A) in an amount of preferably 0.01 to 3% by weight, more preferably 0.1 to 1.0% by weight, particularly preferably 0.2 to 0.5% by weight.

The material for the first inert fine particles may be an inorganic or organic material while an inorganic material being preferable. The inorganic inert fine particles are selected, for example, from silica, alumina, kaolin, titanium dioxide, calcium carbonate and barium sulfate. The organic inert fine particles are selected, for example, from crosslinked silicone resin particles.

The first inert fine particles can be used singly or as a mixture of two or more. As required, other inert fine particles may be used together.

The intrinsic viscosity of the first aromatic copolyester is preferably 0.52 to 0.80, more preferably 0.54 to 0.70, particularly preferably 0.57 to 0.65.

The surface roughness (Ra) of the first layer (A) is preferably 2 to 10 nm.

The second layer (B) comprises a second aromatic copolyester, or a melt-blending product consisting of a second aromatic copolyester and a third aromatic polyester.

The second aromatic copolyester is composed of ethylene terephthalate as the main recurring unit and has a melting point of 210° to 252° C.

The second aromatic copolyester (a2) can contain at least one dicarboxylic acid component selected from the group consisting of aromatic dicarboxylic acids other than terephthalic acid, aliphatic dicarboxylic acids and alicyclic dicarboxylic acids, in an amount of 2 to 19 mole % based on the total dicarboxylic acid components.

Similarly, the second aromatic copolyester (a2) can contain at least one glycol selected from the group consisting of aliphatic glycols other than ethylene glycol and alicyclic glycols, in an amount of 2 to 19 mole % based on the total glycol components.

As the aromatic dicarboxylic acids other than terephthalic acid, there can be mentioned, for example, isophthalic acid and the same aromatic dicarboxylic acids as mentioned with regard to the first aromatic copolyester. Also as the aliphatic dicarboxylic acids, the alicyclic dicarboxylic acids, the aliphatic glycols other than ethylene glycol and the alicyclic glycols, there can be mentioned, for example, the same dicarboxylic acids and glycols as mentioned above.

When the second layer (B) comprises a second aromatic copolyester alone, it is desirable that the second aromatic copolyester is composed of ethylene terephthalate as the main recurring unit and has a melting point of 210° to 245° C., preferably 215° to 235° C.

When the second layer comprises a melt-blend product consisting of a second aromatic copolyester and a third aromatic polyester, the melt-blend product consists of 60% by weight or more of the second aromatic copolyester and 40% by weight or less of the third aromatic polyester. The third aromatic polyester is composed of tetramethylene terephthalate as the main recurring unit and has a melting point of 180° to 223° C.

The second aromatic copolyester is composed of ethylene terephthalate as the main recurring unit and has a melting point of 210° to 252° C., preferably 220° to 250° C.

The third aromatic polyester may be a homopolyester composed of tetramethylene terephthalate as the substantial recurring unit, or may be a copolyester composed of tetramethylene terephthalate as the main recurring unit.

When the third aromatic polyester is a copolyester, there can be mentioned, as the subordinate dicarboxylic acid(s) other than terephthalic acid, at least one dicarboxylic acid selected from the group consisting of aromatic dicarboxylic acids other than terephthalic acid, aliphatic dicarboxylic acids and alicyclic dicarboxylic acids. The aromatic dicarboxylic acids other than terephthalic acid, the aliphatic dicarboxylic acids and the alicyclic dicarboxylic acids include, for example, the same dicarboxylic acids as mentioned above.

The melt-blend product consisting of a second aromatic copolyester and a third aromatic polyester preferably consists of 95 to 60% by weight of a second aromatic copolyester and 5 to 40% by weight of a third aromatic polyester.

The second layer (B) can contain inert fine particles, similarly to the first layer (A). The inert fine particles are preferably second inert fine particles having an average particle diameter of 0.03 to 2.5 μm. Such second inert fine particles can be present in the second layer (B) in an amount of 30% by weight or less.

By allowing the second layer (B) to contain the second inert fine particles in an amount of at least 5% by weight, the resulting laminated film can have improved properties particularly in impact resistance.

The material for the second inert fine particles can be selected from the same materials as mentioned with regard with the first inert fine particles. The material for the second inert fine particles is particularly preferably titanium dioxide.

The average particle diameter of the second inert fine particles is preferably 0.05 to 1.5 μm, more preferably 0.1 to 0.5 μm.

The content of the second inert fine particles is preferably 10 to 20% by weight.

The second inert fine particles can be added to at least either of the second aromatic copolyester and the third aromatic polyester, or to the melt-blend product consisting of the second aromatic copolyester and the third aromatic polyester.

The surface roughness (Ra) of the second layer (B) is preferably 15 to 100 nm, more preferably 15 to 80 nm. A surface roughness (Ra) smaller than 15 nm is not preferable because the handleability (winding property) of the film is deteriorated.

The laminated film of the present invention comprises the first layer (A) and the second layer (B), as mentioned above.

The ratio of the thickness of the first layer (A) to the thickness of the second layer (B) is preferably in the range of 0.02 to 1.5, more preferably 0.04 to 0.67, particularly preferably 0.04 to 0.25.

The thickness of the laminated polyester film of the present invention is preferably 6 to 75 μm, more preferably 10 to 75 μm, particularly preferably 15 to 50 μm.

The laminated polyester film of the present invention exhibits excellent moldability when laminated onto a metal plate and subjected to deep drawing. The present film is characterized particularly in that it exhibits a deep-drawability (2) (to be mentioned later) of 0.1 mA or less when laminated onto a metal plate and subjected to deep drawing.

The laminated polyester film of the present invention has a lamination structure in which the first layer (A) formed of a first aromatic copolyester and the second layer (B) formed of a second or third aromatic (co)polyester are laminated. Such a lamination structure can be produced, for example, by a method which comprises separately melting individual polyesters for formation of respective layers, subjecting the molten polyesters to co-extrusion to laminate and fuse them before their solidification, and then subjecting the resulting laminate to biaxial stretching and thermosetting, or by a method which comprises subjecting individual polyesters separately to melting and extruding to form into films and, in unstretched states or after stretching, laminating and fusing the two films.

The laminated polyester film of the present invention may be an unstretched film, but is generally used in a state in which the film is biaxially stretched and thermoset. In this case, the first aromatic copolyester layer (A) has a refractive index in the thickness direction, of preferably 1.490 to 1.550, more preferably larger than 1.505 but not larger than 1.540. When the refractive index is too low, the resulting laminated film has insufficient moldability. On the other hand, when the refractive index is too high, the first aromatic copolyester layer (A) has a nearly amorphous structure and resultingly, the laminated film has low heat resistance in some cases.

As the metal plates, particularly metal plates for can fabrication, onto which the laminated copolyester film of the present invention is laminated, there are appropriately used a tin-plated steel plate, a tin-free steel plate, an aluminum plate, etc. The bonding of the laminated polyester film onto a metal plate can be conducted, for example, by the following methods (1) and (2).

(1) A metal plate is heated to a temperature of its melting point or above, a film is laminated thereonto and then is cooled, whereby that surface layer portion (thin layer portion) of the film which contacts with the metal plate is made amorphous and tight adhesion is achieved.

(2) An adhesive layer as a primer coat is formed on a film, and the adhesive layer side of the film is laminated onto a metal plate. As the adhesive, there can be used known resin adhesives, for example, an epoxy-based adhesive, an epoxy/ester-based adhesive and an alkyd-based adhesive.

In laminating the laminated copolyester film of the present invention onto a metal plate, it is preferable to laminate the second aromatic copolyester layer (B) side of the film onto a metal plate.

It is advantageous to laminate the layer (B) of large surface roughness (Ra) onto a metal plate while the layer (A) of small surface roughness (Ra) being positioned outside, because such bonding can better suppress the generation of pinholes caused by the lubricant in fabrication of the resulting laminate.

The laminated copolyester film of the present invention may comprise, as necessary, other additional layer between the first polyester layer (A) and the second polyester layer (B), or at one side of the film.

EXAMPLES

The present invention is hereinafter described in more detail by way of Examples.

Examples 1–6 and Comparative Examples 1–4

The following two polyethylene terephthalates:

a polyethylene terephthalate for a first aromatic copolyester layer (A), which contained the component shown in Table 1 as a copolymer unit and which had an intrinsic viscosity of 0.64 and contained 0.1% by weight of a truly spherical silica having a particle diameter ratio of 1.1 and an average particle diameter of 0.3 μm, and a polyethylene terephthalate for a second aromatic copolyester layer (B), which contained the component shown in Table 1 as a copolymer unit and which had an intrinsic viscosity of 0.64 and contained 0.1% by weight of a truly spherical silica having a particle diameter ratio of 1.1 and an average particle diameter of 1.5 μm were separately dried and melted according to an ordinary method, and then were subjected to co-extrusion through two adjacent dies thereby to laminate and fuse them, and then rapidly cooling to solidify to prepare an unstretched laminated film.

Thus-prepared unstretched films were stretched 3.0-fold in the longitudinal direction at 110° C. and then 3-fold in the transverse direction at 120° C., followed by thermosetting at 190° C., to obtain biaxially oriented laminated films.

Each of the films had a thickness of 25 μm. In each film, the thicknesses of the first aromatic copolyester layer (A) and the second aromatic copolyester layer (B) were 5 μm and 20 μm, respectively; and the surface roughnesses (Ra) of said layers were 5 nm and 23 nm, respectively.

The surface roughness (Ra) was measured by using a contact needle type surface roughness measuring apparatus (SURFCORDER SE-30C, a product of Kosaka Laboratory Co., Ltd.), under the conditions of a contact needle radius of 2 μm, a measurement pressure of 0.03 g and a cut-off value of 0.25 mm.

Examples 7 and 8 and Comparative Examples 7 and 8

Biaxially oriented laminated films were obtained in the same manner as in Example 2 except that the average particle diameters and contents of the truly spherical silicas contained in the first aromatic copolyester layer (A) and second aromatic copolyester layer (B) of the Example 2 film were changed as shown in Table 2 to change the surface roughnesses (Ra) of the two layers.

TABLE 1

|  | First aromatic copolyester layer (A) | | | | Second aromatic copolyester layer (B) | | | |
|---|---|---|---|---|---|---|---|---|
|  | Copolymer component | | Melting point | Glass transition temp. | Copolymer component | | Melting point | Glass transition temp. |
|  | Composition | mole % | (°C.) | (°C.) | Composition | mole % | (°C.) | (°C.) |
| Comparative Example 1 | Isophthalic acid | 12 | 228 | 73 | Isophthalic acid | 20 | 205 | 73 |
| Example 1 | Isophthalic acid | 12 | 228 | 73 | Isophthalic acid | 17 | 215 | 73 |
| Example 2 | Isophthalic acid | 12 | 228 | 73 | Isophthalic acid | 12 | 229 | 73 |
| Example 3 | Isophthalic acid | 12 | 228 | 73 | Isophthalic acid | 8 | 239 | 74 |
| Comparative Example 2 | Sebacic acid | 12 | 232 | 53 | Isophthalic acid | 12 | 229 | 73 |
| Example 4 | Isophthalic acid | 12 | 228 | 73 | Sebacic acid | 12 | 232 | 53 |
| Comparative Example 3 | Isophthalic acid | 20 | 205 | 73 | Adipic acid | 12 | 231 | 53 |
| Example 5 | Isophthalic acid | 17 | 215 | 73 | Adipic acid | 12 | 231 | 53 |
| Example 6 | Isophthalic acid | 8 | 239 | 74 | Adipic acid | 12 | 231 | 53 |
| Comparative Example 4 | Isophthalic acid | 1 | 225 | 76 | Adipic acid | 12 | 231 | 53 |

TABLE 2

|  | First aromatic copolyester layer (A) | | | Second aromatic copolyester layer (B) | | |
|---|---|---|---|---|---|---|
|  | Silica | | | Silica | | |
|  | Average particle diameter (μm) | Content (wt. %) | Surface roughness (Ra) (nm) | Average particle diameter (μm) | Content (wt. %) | Surface roughness (Ra) (nm) |
| Comparative Example 7 | 0.5 | 0.2 | 7 | 0.8 | 0.26 | 13 |
| Example 7 | 0.8 | 0.17 | 11 | 1.2 | 0.1 | 16 |
| Example 8 | 1.2 | 0.06 | 13 | 1.2 | 0.15 | 20 |
| Comparative Example 8 | 1.5 | 0.05 | 16 | 1.5 | 0.1 | 29 |

Comparative Examples 5 and 6

The two-layer structure employed in Example 2 was changed to a single-layer structure. That is, there were prepared single-layer films each of 25 μm in thickness comprising only the same first aromatic copolyester layer (A) as in Example 2 (Comparative Example 5), or only the same second aromatic copolyester layer (B) as in Example 2 (Comparative Example 6).

Each of the total 16 films obtained in Examples 1 to 8 and Comparative Examples 1 to 8 was laminated onto the both sides of a tin-free steel plate, heated to 230° C., of 0.25 mm in thickness such that the first aromatic copolyester layer (B) side of the film contacted the tin-free steel plate. After water-cooling, circular plates of 150 mm in diameter were cut off from the resulting plates. Each circular plate was subjected to deep drawing in four stages using a drawing die and a punch to prepare side-seamless containers (hereinafter referred to as cans) of 55 mm in diameter.

These cans were subjected to the following observations and tests, and evaluated under the following standards.
(1) Deep-drawability (1)
  ○ In deep drawing, the film of can cause no abnormality and show neither whitening nor rupture.
  Δ The film at the can top shows whitening.
  x: The film shows partial rupture.
(2) Deep-drawability (2)
  ○ There occurs no abnormality in deep drawing, and the electric current value of 0.1 mA or less is obtained in a rust test for the inside film of can (a 1% aqueous NaCl solution is placed in a can to be tested, an electrode is inserted thereinto, a voltage of 6 V is applied with the can used as an anode, and the resulting electric current is measured. This test is hereinafter referred to as ERV test).
  x: The inside and outside films of can show no abnormality, but the electric current in the ERV test is 0.1 mA or more and, when the film portions through which electricity passes are observed under magnification, the portions show pinhole-shaped cracks starting from large lubricant particles.
(3) Impact resistance
  Each of 10 cans which were well deep-drawn was completely filled with water, then cooled to 10° C., and dropped on a floor made of polyvinyl chloride tiles, from a height of 30 cm. Then, the inside of each can was subjected to the ERV test.

○ All 10 cans gave 0.3 mA or less.
  Δ 1–5 cans gave 0.3 mA or more.
  x: 6 or more cans gave 0.3 mA or more, or had cracks of film after dropped.
(4) Heat embrittlement resistance
  Each of 10 cans which were well deep-drawn was heated at 200° C. for 5 minutes and then measured for the impact resistance mentioned in the above (3).
  ○ All 10 cans gave 0.3 mA or less.
  Δ 1–5 cans gave 0.3 mA or more.
  x: 6 or more cans gave 0.3 mA or more, or showed cracks of film after heating of 200° C. for 5 minutes.
(5) Retort sterilization resistance
  Each of 10 cans which were well deep-drawn was completely filled with water, subjected to retort sterilization at 120° C. for 1 hour using a steam sterilizer, and then stored at 50° C. for 30 days. Each of the resulting cans was dropped on a floor made of polyvinyl chloride tiles, from a height of 1 m. Then, the inside of each can was subjected to the ERV test.

○ All 10 cans gave 0.3 mA or less.
  Δ 1–5 cans gave 0.3 mA or more.
  x: 6 or more cans gave 0.3 mA or more, or had cracks of film after dropped.
(6) Flavor-retaining property
  A can formed in good deep-drawability was filled with a carbonated water, then sealed tightly, and stored at 37° C. for 30 days. Then, the can was opened and examined for change in flavor by an organoleptic test.
  ○ There was no change in flavor.
  Δ There was slight change in flavor.
  x: There was change in flavor.
(7) Taste-retaining property
  Change in taste was examined by an organoleptic test, in the same manner as in the above (6).
  ○ There was no change in taste.
  Δ There was slight change in taste.
  x: There was change in taste.
  The results of the above seven items and the results of winding property are shown in Table 3.

TABLE 3

|  | Deep-drawability (1) | Deep-drawability (2) | Impact resistance | Heat brittlement resistance | Retort sterilization resistance | Flavor-retaining property | Taste-retaining property | Winding property |
| --- | --- | --- | --- | --- | --- | --- | --- | --- |
| Comp. Ex. 1 | ○ | ○ | Δ | X | X | ○ | ○ | Good |
| Example 1 | ○ | ○ | ○ | ○ | ○ | ○ | ○ | Good |
| Example 2 | ○ | ○ | ○ | ○ | ○ | ○ | ○ | Good |
| Example 3 | ○ | ○ | ○ | ○ | ○ | ○ | ○ | Good |
| Comp. Ex. 2 | ○ | ○ | Δ | ○ | Δ | X | Δ | Good |
| Example 4 | ○ | ○ | ○ | ○ | ○ | ○ | ○ | Good |
| Comp. Ex. 3 | ○ | ○ | Δ | X | Δ | ○ | ○ | Good |
| Example 5 | ○ | ○ | ○ | ○ | ○ | ○ | ○ | Good |
| Example 6 | ○ | ○ | ○ | ○ | ○ | ○ | ○ | Good |
| Comp. Ex. 4 | X | — | — | — | — | — | — | Good |
| Comp. Ex. 5 | ○ | ○ | ○ | ○ | ○ | ○ | ○ | Poor |
| Comp. Ex. 6 | ○ | ○ | Δ | ○ | ○ | X | X | Good |
| Comp. Ex. 7 | ○ | ○ | Δ | ○ | ○ | ○ | ○ | Good |
| Example 7 | ○ | ○ | ○ | ○ | ○ | ○ | ○ | Good |
| Example 8 | ○ | ○ | ○ | ○ | ○ | ○ | ○ | Good |
| Comp. Ex. 8 | ○ | ○ | ○ | ○ | ○ | ○ | X | Good |

As is clear from the results of Table 3, the cans using the laminated polyester films of the present invention are superior in deep-drawability, heat embrittlement resistance, retort sterilization resistance and flavor-retaining property, as well as in impact resistance particularly at low temperatures, do not deteriorate the tastes of beverage, etc., and have good winding property.

Examples 9–14

The following two polyethylene terephthalates:
  a polyethylene terephthalate for a first aromatic copolyester layer (A), which contained the component shown in Table 4 as a copolymer unit and which had an intrinsic viscosity of 0.64 and contained 0.1% by weight of a truly spherical silica having a particle diameter ratio of 1.1 and an average particle diameter of 0.3 4μm, and
  a polyethylene terephthalate for a second aromatic copolyester layer (B), which contained the component shown in Table 4 as a copolymer unit and which had an intrinsic viscosity of 0.64 and contained 18% by weight of titanium dioxide having an average particle diameter of 0.27 μm were separately dried and melted according to an ordinary method, and then were subjected to co-extrusion through two adjacent dies thereby to laminate and fuse them, and then rapidly cooling to solidify to prepare an unstretched laminated film.

These unstretched films were stretched 3.0-fold in the longitudinal direction at 110° C. and then 3-fold in the transverse direction at 120° C., followed by thermosetting at 190° C., to obtain biaxially oriented laminated films.

Each of the films had a thickness of 25 μm. In each film, the thicknesses of the first aromatic copolyester layer (A) and the second aromatic copolyester layer (B) were 5 μm and 20 μm, respectively, and the surface roughnesses (Ra) of said layers were 5 nm and 58 nm, respectively.

Examples 18 and 19 and Comparative Example 9

Biaxially oriented laminated films were obtained in the same manner as in Example 10 except that the average particle diameter and content of the truly spherical silica contained in the first aromatic copolyester layer (A) of the Example 10 film and the average particle diameter and content of the titanium dioxide contained in the second aromatic copolyester layer (B) of the Example 10 film were changed as shown in Table 6 to change the surface roughnesses (Ra) of the two layers of the Example 10 film.

TABLE 4

|  | First aromatic copolyester layer (A) | | | | Second aromatic copolyester layer (B) | | | |
|---|---|---|---|---|---|---|---|---|
|  | Copolymer component | | Melting point | Glass transition temp. | Copolymer component | | Melting point | Glass transition temp. |
|  | Composition | mole % | (°C.) | (°C.) | Composition | mole % | (°C.) | (°C.) |
| Example 9 | Isophthalic acid | 12 | 228 | 73 | Isophthalic acid | 17 | 215 | 73 |
| Example 10 | Isophthalic acid | 12 | 228 | 73 | Isophthalic acid | 12 | 229 | 73 |
| Example 11 | Isophthalic acid | 12 | 228 | 73 | Isophthalic acid | 8 | 239 | 74 |
| Example 12 | Isophthalic acid | 12 | 228 | 73 | Isophthalic acid | 12 | 232 | 53 |
| Example 13 | Isophthalic acid | 17 | 215 | 73 | Sebacic acid | 12 | 231 | 53 |
| Example 14 | Isophthalic acid | 8 | 239 | 74 | Adipic acid | 12 | 231 | 53 |

Examples 15–17

Biaxially oriented laminated films were obtained in the same manner as in Example 5 except that the amount of titanium dioxide contained in the second aromatic copolyester layer (B) of the Example 10 film was changed as shown in Table 5. In Table 5 is also shown the surface roughness (Ra) of each second aromatic copolyester layer (B).

TABLE 6

|  | First aromatic copolyester layer (A) | | | Second aromatic copolyester layer (B) | | |
|---|---|---|---|---|---|---|
|  | Silica | | | Silica | | |
|  | Average particle diameter (μm) | Content (wt. %) | Surface roughness (Ra) (nm) | Average particle diameter (μm) | Content (wt. %) | Surface roughness (Ra) (nm) |
| Example 18 | 0.5 | 0.17 | 11 | 0.15 | 10 | 26 |
| Example 19 | 1.2 | 0.06 | 13 | 0.2 | 10 | 33 |
| Comparative Example 9 | 1.5 | 0.05 | 16 | 0.2 | 15 | 41 |

TABLE 5

|  | Titanium dioxide content (wt. %) | Surface roughness (Ra) (nm) |
|---|---|---|
| Example 15 | 6 | 37 |
| Example 16 | 10 | 44 |
| Example 17 | 28 | 71 |

Each of the total 12 films obtained in Examples 9 to 19 and Comparative Example 9 was laminated onto the both sides of a tin-free steel plate, heated to 230° C., of 0.25 mm in thickness such that the second aromatic copolyester layer (B) side of film contacted the tin-free steel plate. After water-cooling, circular plates of 150 mm in diameter were cut off from the resultant plates. Each circular plate was subjected to deep drawing in four stages using a drawing die and a punch to prepare side-seamless containers (hereinafter referred to as cans) of 55 mm in diameter.

These cans were subjected to the same observations and tests as in Examples 1–8 and evaluated. The results are shown in Table 7.

18% by weight of titanium dioxide having an average particle diameter of 0.27 μm

TABLE 7

|  | Deep-drawability (1) | Deep-drawability (2) | Impact resistance | Heat brittlement resistance | Retort sterilization resistance | Flavor-retaining property | Taste-retaining property | Winding property |
|---|---|---|---|---|---|---|---|---|
| Example 9 | ○ | ○ | ○ | ○ | ○ | ○ | ○ | Good |
| Example 10 | ○ | ○ | ○ | ○ | ○ | ○ | ○ | Good |
| Example 11 | ○ | ○ | ○ | ○ | ○ | ○ | ○ | Good |
| Example 12 | ○ | ○ | ○ | ○ | ○ | ○ | ○ | Good |
| Example 13 | ○ | ○ | ○ | ○ | ○ | ○ | ○ | Good |
| Example 14 | ○ | ○ | ○ | ○ | ○ | ○ | ○ | Good |
| Example 15 | ○ | ○ | ○ | ○ | ○ | ○ | ○ | Good |
| Example 16 | ○ | ○ | ○ | ○ | ○ | ○ | ○ | Good |
| Example 17 | ○ | ○ | ○ | ○ | ○ | ○ | ○ | Good |
| Example 18 | ○ | ○ | ○ | ○ | ○ | ○ | ○ | Good |
| Example 19 | ○ | ○ | ○ | ○ | ○ | ○ | ○ | Good |
| Comp. Ex. 9 | ○ | ○ | ○ | ○ | ○ | ○ | X | Good |

As is also clear from the results of Table 7, the cans using the polyester films of the present invention are superior in deep-drawability, heat embrittlement resistance, retort sterilization resistance and flavor-retaining property, as well as in impact resistance particularly at low temperatures, do not deteriorate the tastes of beverage, etc., and have good winding property.

Examples 20–25 and Comparative Examples 10–12

The following two polymeric substances:
a polyethylene terephthalate for a first aromatic copolyester layer (A), which contained the component shown in Table 8 as a copolymer unit and which had an intrinsic viscosity of 0.64 and contained 0.1% by weight of a truly spherical silica having a particle diameter ratio of 1.1 and an average particle diameter of 0.3 μm, and
a polyester melt-blend product (shown in Table 8) for a second aromatic copolyester layer (B), which contained were separately dried and melted according to an ordinary method, and then were subjected to coextrusion through two adjacent dies thereby to laminate and fuse them, and then rapidly cooling to solidify to prepare an unstretched laminated film.

These unstretched films were stretched 2.9-fold in the longitudinal direction at 110° C. and then 3-fold in the transverse direction at 120° C., followed by thermosetting at 190°, to obtain biaxially oriented laminated films.

Each of the films had a thickness of 25 μm. In each film, the thicknesses of the first aromatic copolyester layer (A) and the second polyester layer (B) were 5 μm and 20 μm, respectively; and the surface roughnesses (Ra) of said layers were 5 nm and 53 nm, respectively.

TABLE 8

| | First aromatic copolyester layer (A) | | | |
|---|---|---|---|---|
| | Copolymer component | | Melting Point (°C.) | Glass transition temp. (°C.) |
| | Composition | mole % | | |
| Example 20 | Isophthalic acid | 18 | 213 | 73 |
| Example 21 | Isophthalic acid | 12 | 229 | 73 |
| Example 22 | Isophthalic acid | 8 | 239 | 74 |
| Comp. Ex. 10 | Isophthalic acid | 12 | 229 | 73 |
| Example 23 | Isophthalic acid | 12 | 229 | 73 |
| Example 24 | Isophthalic acid | 12 | 229 | 73 |
| Example 25 | Isophthalic acid | 12 | 229 | 73 |
| Comp. Ex. 11 | Isophthalic acid | 12 | 229 | 73 |
| Comp. Ex. 12 | Isophthalic acid | 12 | 229 | 73 |

| | Second polyester layer (B) | | | | | | | |
|---|---|---|---|---|---|---|---|---|
| | Copolymer PET* | | | | | PBT** or copolymer PBT | | |
| | Copolymer component | | Melting point (°C.) | Intrinsic viscosity *** | Amount (%) | Copolymer component | | Melting point (°C.) | Intrinsic viscosity *** | Amount (%) |
| | Composition | mole % | | | | Composition | mole % | | | |
| Example 20 | Isophthalic acid | 12 | 229 | 0.91 | 85 | — | — | 223 | 0.91 | 25 |
| Example 21 | Isophthalic acid | 12 | 229 | 0.91 | 85 | — | — | 223 | 0.91 | 25 |

TABLE 8-continued

| | | | | | | | | | | |
|---|---|---|---|---|---|---|---|---|---|---|
| Example 22 | Isophthalic acid | 12 | 229 | 0.91 | 85 | — | — | 223 | 0.91 | 25 |
| Comp. Ex. 10 | Isophthalic acid | 9 | 235 | 0.65 | 55 | Isophthalic acid | 5 | 214 | 0.89 | 45 |
| Example 23 | Isophthalic acid | 9 | 235 | 0.70 | 60 | Isophthalic acid | 5 | 214 | 0.89 | 40 |
| Example 24 | Sebacic acid | 9 | 235 | 0.70 | 90 | Isophthalic acid | 5 | 214 | 0.89 | 10 |
| Example 25 | Sebacic acid | 12 | 229 | 0.70 | 96 | — | — | 223 | 0.91 | 4 |
| Comp. Ex. 11 | Sebacic acid | 22 | 208 | 0.65 | 85 | — | — | 223 | 0.92 | 15 |
| Comp. Ex. 12 | Sebacic acid | 12 | 119 | 0.65 | 85 | Isophthalic acid | 20 | 178 | 0.87 | 15 |

*PET: Polyethylene terephthalate;
**PBT: Polytetramethylene terephthalate
***Inherent viscosity before compounding Examples 26–28

Biaxially oriented laminated films were obtained in the same manner as in Example 21 except that the amount of titanium dioxide contained in the second polyester layer (B) of the Example 21 film was changed as shown in Table 9. In Table 9 is also shown the surface roughness (Ra) of each second polyester layer (B).

TABLE 9

| | Titanium dioxide content (wt. %) | Surface roughness (Ra) (nm) |
|---|---|---|
| Example 26 | 6 | 38 |
| Example 27 | 10 | 45 |
| Example 28 | 28 | 75 |

Examples 29 and 30

Biaxially oriented laminated films were obtained in the same manner as in Example 2 except that the average particle diameter and content of the truly spherical silica contained in the first aromatic copolyester layer (A) of the Example 21 film and the average particle diameter and content of the titanium dioxide contained in the second polyester layer (B) of the Example 21 film were changed as shown in Table 10 to change the surface roughnesses (Ra) of the two layers of the Example 21 film.

Each of the total 11 films obtained in Examples 20 to 30 was laminated onto the both sides of a tin-free steel plate, heated to 230° C., of 0.25 mm in thickness such that the polyester layer (B) side of film contacted the tin-free steel plate. After water-cooling, circular plates of 150 mm in diameter were cut off from the resultant plates. Each circular plate was subjected to deep drawing in four stages using a drawing die and a punch to prepare side-seamless containers (hereinafter referred to as cans) of 55 mm in diameter.

These cans were subjected to the same observations and tests as in Examples 1 to 8 and evaluated. The results are shown in Table 11.

TABLE 10

| | First aromatic copolyester layer (A) Silica | | | Second aromatic copolyester layer (B) Silica | | |
|---|---|---|---|---|---|---|
| | Average particle diameter (μm) | Content (wt. %) | Surface roughness (Ra) (nm) | Average particle diameter (μm) | Content (wt. %) | Surface roughness (Ra) (nm) |
| Example 29 | 0.8 | 0.17 | 11 | 0.15 | 10 | 25 |
| Example 30 | 1.2 | 0.06 | 13 | 0.23 | 10 | 36 |

TABLE 11

| | Deep-drawability (1) | Deep-drawability (2) | Impact resistance | Heat brittlement resistance | Retort sterilization resistance | Flavor-retaining property | Taste-retaining property | Winding property |
|---|---|---|---|---|---|---|---|---|
| Example 20 | ○ | ○ | ○ | ○ | ○ | ○ | ○ | Good |
| Example 21 | ○ | ○ | ○ | ○ | ○ | ○ | ○ | Good |
| Example 22 | ○ | ○ | ○ | ○ | ○ | ○ | ○ | Good |

TABLE 11-continued

|  | Deep-drawability (1) | Deep-drawability (2) | Impact resistance | Heat brittlement resistance | Retort sterilization resistance | Flavor-retaining property | Taste-retaining property | Winding property |
|---|---|---|---|---|---|---|---|---|
| Comp. Ex. 10 | X | — | — | — | — | — | — | Good |
| Example 23 | ○ | ○ | ○ | ○ | ○ | ○ | ○ | Good |
| Example 24 | ○ | ○ | ○ | ○ | ○ | ○ | ○ | Good |
| Example 25 | ○ | ○ | ○ | ○ | ○ | ○ | ○ | Good |
| Comp. Ex. 11 | X | Δ | X | X | Δ | ○ | ○ | Good |
| Comp. Ex. 12 | ○ | ○ | ○ | X | X | ○ | ○ | Poor |
| Example 26 | ○ | ○ | ○ | ○ | ○ | ○ | ○ | Good |
| Example 27 | ○ | ○ | ○ | ○ | ○ | ○ | ○ | Good |
| Example 28 | ○ | ○ | ○ | ○ | ○ | ○ | ○ | Good |
| Example 29 | ○ | ○ | ○ | ○ | ○ | ○ | ○ | Good |
| Example 30 | ○ | ○ | ○ | ○ | ○ | ○ | ○ | Good |

As is also clear from the results of Table 11, the cans using the laminated polyester films of the present invention are superior in deep-drawability, heat embrittlement resistance, retort sterilization resistance and flavor-retaining property, as well as in impact resistance particularly at low temperatures, do not deteriorate the tastes of beverage, etc., and have good winding property.

We claim:

1. A laminated polyester film to be laminated onto metal plate, characterized in that the film comprises:

(A) a first layer which comprises:
a first aromatic copolyester composed of terephthalic acid and isophthalic acid as the main dicarboxylic acid components and ethylene glycol as the main glycol component, said first aromatic copolyester containing isophthalic acid in an amount of 5 to 19 mole % based on the total amount of the dicarboxylic acid components and having a melting point of 210° to 245° C., and
first inert fine particles having an average particle diameter of 0.05 to 0.6 μm in an amount of 0.01 to 3% by weight,
said first layer having a surface roughness (Ra) of 2 to 13 nm; and (B) a second layer which comprises:
a second aromatic copolyester composed of ethylene terephthalate as the main recurring unit and having a melting point of 210° to 252° C., or a melt-blend product consisting of 60% by weight or more of said second aromatic copolyester and 40% by weight or less of a third aromatic polyester composed of tetramethylene terephthalate as the main recurring unit and having a melting point of 180° to 223° C., and
second inert fine particles having an average particle diameter of 0.03 to 2.5 μm in an amount of 30% by weight or less,
said second layer having a surface roughness (Ra) of at least 15 nm.

2. A laminated polyester film as defined in claim 1, wherein the first aromatic copolyester (a1) has a melting point of 215 to 235° C.

3. A laminated polyester film as defined in claim 1, wherein the surface roughness (Ra) of the first layer (A) is 2 to 10 nm.

4. A laminated polyester film as defined in claim 1, wherein the second aromatic copolyester (a2) contains at least one dicarboxylic acid component selected from the group consisting of aromatic dicarboxylic acids other than terephthalic acid, aliphatic dicarboxylic acids and alicyclic dicarboxylic acids, in an amount of 2 to 19 mole % based on the total amount of the dicarboxylic acid components.

5. A laminated polyester film as defined in claim 1, wherein the second aromatic copolyester (a2) contains at least one glycol selected from the group consisting of aliphatic glycols other than ethylene glycol and alicyclic glycols, in an amount of 2 to 19 mole % based on the total amount of the glycol components.

6. A laminated polyester film as defined in claim 1, wherein the second layer (B) comprises a second aromatic copolyester composed of ethylene terephthalate as the main recurring unit and having a melting point of 210° to 245° C.

7. A laminated polyester film as defined in claim 6, wherein the melting point of the second aromatic copolyester is 215° to 235° C.

8. A laminated polyester film as defined in claim 1, wherein the second layer (B) comprises a melt-blend product consisting of 60% by weight or more of a second aromatic copolyester composed of ethylene terephthalate as the main recurring unit and having a melting point of 210° to 252° C. and 40% by weight or less of a third aromatic polyester composed of tetramethylene terephthalate as the main recurring unit and having a melting point of 180° to 223° C.

9. A laminated polyester film as defined in claim 8, wherein the second aromatic copolyester has a melting point of 220° to 250° C.

10. A laminated polyester film as defined in claim 8, wherein the third aromatic polyester contains at least one dicarboxylic acid selected from the group consisting of (i) aromatic dicarboxylic acids other than terephthalic acid, (ii) aliphatic dicarboxylic acids and (iii) alicyclic dicarboxylic acids.

11. A laminated polyester film as defined in claims 8, wherein the second layer (B) comprises a melt-blend product consisting of 95 to 60% by weight of a second aromatic copolyester and 5 to 40% by weight of a third aromatic polyester.

12. A laminated polyester film as defined in claim 1, wherein the surface roughness (Ra) of the second layer (B) is 15 to 100 nm.

13. A laminated polyester film as defined in claim 1, wherein the ratio of the thickness of the first layer (A) to the thickness of the second layer (B) is in the range of 0.02 to 1.5.

14. A laminated polyester film as defined in claim 1, which has a total thickness of 6 to 75 μm.

15. A laminated polyester film as defined in claim 1, which exhibits a deep-drawability (2) of 0.1 mA or less when laminated onto an iron plate and subjected to deep drawing.

16. A method for preparing a metal can, which comprises laminating a laminated polyester film as defined in claim 1, onto a metal plate and deep-drawing the resulting laminated metal plate to fabricate into a metal can.

* * * * *